Mace & Gwyer,
Refrigerator.

No. 88,190. Patented Mar. 23, 1869.

Witnesses.
C. C. Livings
W. C. Dey

Inventors.
D. H. Mace and F. S. Gwyer
by their atty J. D. Slater

Mace & Gwyer,
Refrigerator.
No. 88,190. Patented Mar. 23, 1869.
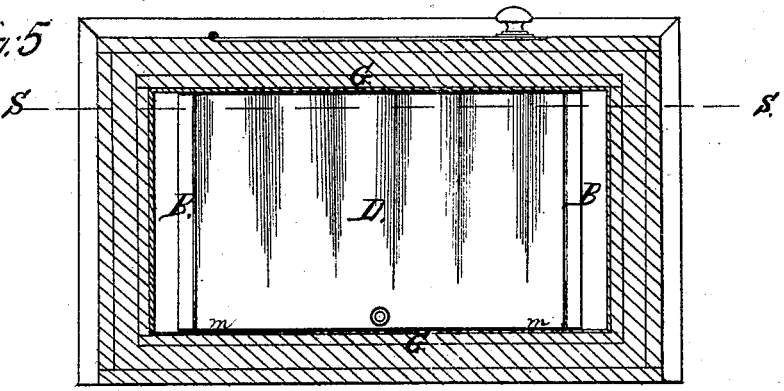
Fig. 5
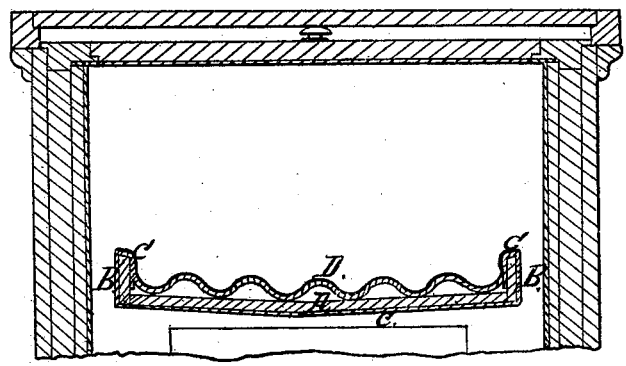
Fig. 6
Fig. 7a
Fig. 7
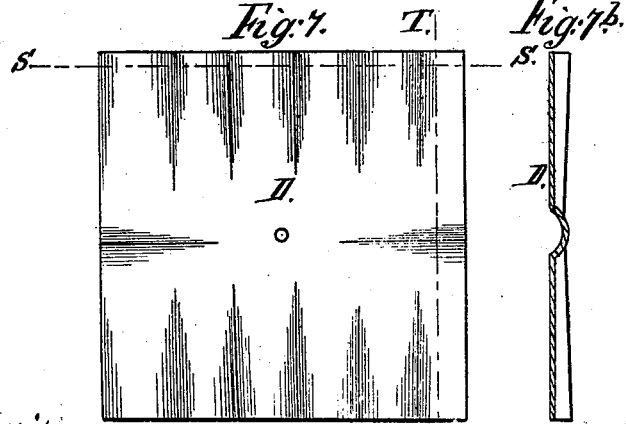
Fig. 7b
Witnesses.
C. C. Livings
W. C. Dey
Inventors.
L. H. Mace and P. S. Gwyer
by then assy. T. L. Stetson

United States Patent Office.

LEVI H. MACE AND FREDERICK S. GWYER, OF NEW YORK, N. Y.

Letters Patent No. 88,190, dated March 23, 1869.

---

IMPROVEMENT IN THE CONSTRUCTION OF REFRIGERATORS.

---

The Schedule referred to in these Letters Patent and making part of the same

---

*To all whom it may concern:*

Be it known that we, LEVI H. MACE and FREDERICK S. GWYER, both of the city and county of New York, State of New York, have invented certain new and useful Improvements in the Construction of Refrigerators; and we do hereby declare that the following is a full and exact description thereof.

Our invention relates to the construction and attaching of the bottom of the ice-chamber, or ice-box of the refrigerator. The bottom is corrugated, and is soldered in.

The accompanying drawings form a part of this specification.

Figure 5 represents another modification of the bottom. In this, the corrugations do not, as we prefer, radiate from a centre, but are parallel. We wish to include all arrangements of the corrugations as in our invention.

Figure 6 is a cross-section on the line S S in fig. 5, showing the curved line along which the soldering is effected at the front with this form of the corrugated bottom.

Figure 7 is a plan view of still another modification in the corrugated bottom.

Figure 7ª is a cross-section on the line S S in fig. 7, and

Figure 7ᵇ is a cross-section on the line T T in the same figure.

Similar letters of reference indicate corresponding parts in the several figures.

A is the thin board which supports the zinc bottom, and

B B are the upright pieces of board, which form the edges of the bottom, or shelf of the refrigerator.

C is an under coating of sheet-zinc, covering the whole under surface of the board A, the outer surface and upper edges of the boards B B, and the inner faces of the boards, or sides B B.

D is a corrugated sheet of stout zinc, having corrugations radiating from the point where the drain-pipe E is attached, as shown in our patent dated March 3, 1868, and having the edges turned up to facilitate the joining of the corrugated sheet D to the inner side-walls G of the refrigerator, and also to the inner facing C of the edge-boards B B.

Figure 1:
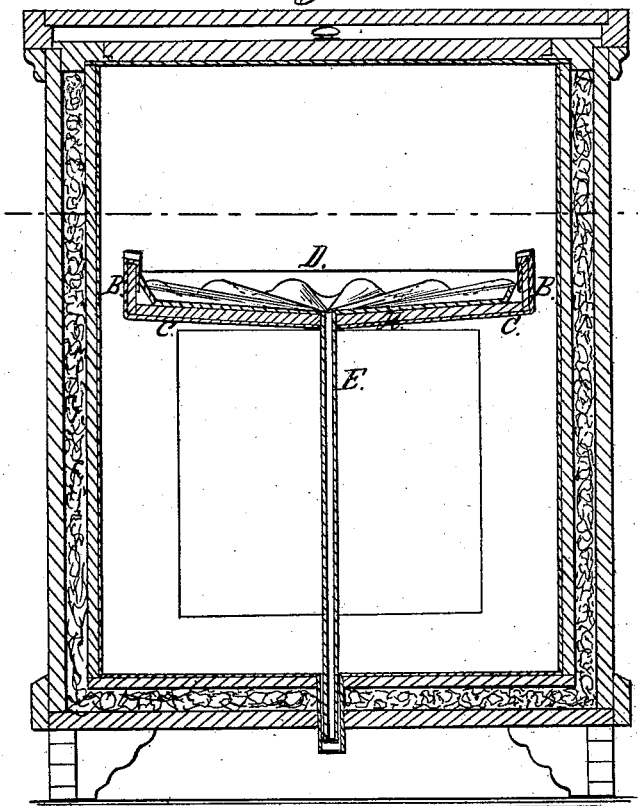
Figure 1 is a cross-section upon the line S S in fig. 3.
Figure 2:
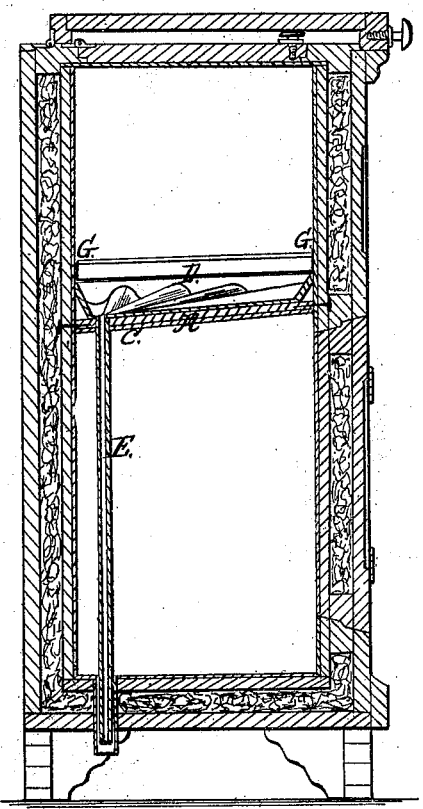
Figure 2 is a section crossing the same in the line T T in fig. 3.
Figure 3:
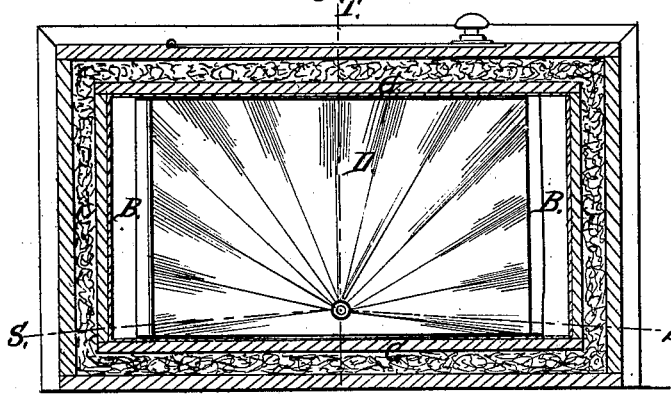
Figure 3 is a horizontal section.
Figure 4:
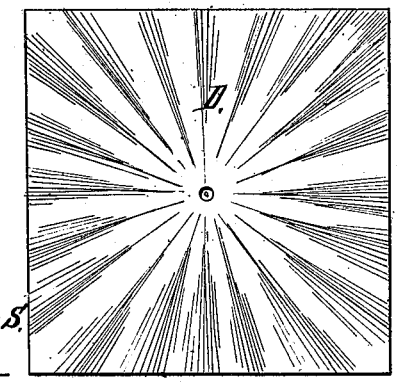
Figure 4 represents a modification of the bottom, adapted for our invention.

We employ a mode of fastening never before applied to corrugated ice-bottoms. We join it by soldering around the edges, the line of solder being denoted in figs. 1, 2, and 3, in red ink.

We have tinted in the figures only the parts in which the novelty lies. The remainder of the refrigerator may be constructed in any approved manner. The part D may be made of other material than sheet-zinc, but it is indispensable that it be corrugated, and that it be also of a material, or coated with a material at the edges, which will solder.

The board A supports the corrugated-metal bottom, by applying directly under each of the depressions, or downward bends, and supports the ridges very efficiently by the arching form. As a whole, the bottom may be made lighter than any other, with equal strength. It holds the ice firmly, glances the tools employed in breaking up the ice, and affords all the well-known advantages accruing from the corrugated forms of the metallic part of the bottom, and is itself strengthened, and affords strength to the safe by the soldering of the edges permanently and strongly to the adjacent parts. The corrugations allow for expansion and contraction in the structure, and afford a combination of elasticity with strength which does not pertain to any other mode of building those parts known to us.

In the form shown in figs. 5 and 6, where the corrugations are parallel, we sink the bottom along the line *m m*, so that the water descending along the several grooves, or depressions, is conducted across, and led directly and easily to the drain-pipe. But we prefer the radiating corrugations.

It will be observed that the turning up of the edges of the bottom, while it facilitates soldering, also considerably strengthens the bottom. We propose, ordinarily, to turn up all the edges, using a good quality of material, which will bear thus shaping, or, as it may be termed, "flanging," without cutting the corners. In some cases, three edges may be thus flanged, and the fourth edge left unflanged. In such instances, the strength thereby imparted to the bottom will be less, but it will serve very well. The unsoldered edge, if one is left unsoldered, should always be on the upper side of the incline, the bottom, as will be understood, being placed inclined.

We can solder an edge which is not flanged, and can flange an edge which is not soldered; but we prefer to employ all the features in combination, as represented.

What we claim as our invention, and desire to secure by Letters Patent, in the construction of refrigerators, is—

The ice-bottom, constructed substantially as herein described, so as to compensate for expansion and contraction, and soldered to the adjacent parts, as and for the purposes herein set forth.

In testimony whereof, we have hereunto set our names, in presence of two subscribing witnesses.

L. H. MACE.
F. S. GWYER.

Witnesses:
S. TOWNSEND CANNON,
G. W. SPRINGER.